(12) United States Patent
Classen et al.

(10) Patent No.: US 9,159,363 B2
(45) Date of Patent: Oct. 13, 2015

(54) SYSTEMS AND METHODS FOR ADJUSTING AUDIO ATTRIBUTES OF CLIP-BASED AUDIO CONTENT

(75) Inventors: Holger Classen, Hamburg (DE); Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 868 days.

(21) Appl. No.: 12/753,334

(22) Filed: Apr. 2, 2010

(65) Prior Publication Data

US 2013/0159852 A1 Jun. 20, 2013

(51) Int. Cl.
- *G06F 3/00* (2006.01)
- *G11B 27/034* (2006.01)
- *G06F 3/16* (2006.01)
- *G11B 27/10* (2006.01)
- *G11B 27/28* (2006.01)

(52) U.S. Cl.
CPC .............. *G11B 27/034* (2013.01); *G06F 3/165* (2013.01); *G11B 27/105* (2013.01); *G11B 27/28* (2013.01)

(58) Field of Classification Search
CPC ..... G06F 3/048; G06F 3/165; G06F 17/3074; G11B 27/031
USPC ........................................................ 715/716
See application file for complete search history.

(56) References Cited

U.S. PATENT DOCUMENTS

| | | | |
|---|---|---|---|
| 5,204,969 A * | 4/1993 | Capps et al. | 704/278 |
| 5,883,804 A | 3/1999 | Christensen | |
| 6,365,817 B1 * | 4/2002 | Suzuki et al. | 84/603 |
| 7,283,879 B2 | 10/2007 | Zeevi et al. | |
| 7,319,761 B2 * | 1/2008 | Bianchi et al. | 715/716 |
| 7,756,281 B2 * | 7/2010 | Goldstein et al. | 381/309 |
| 8,332,757 B1 * | 12/2012 | Davey et al. | 715/716 |
| 8,433,079 B1 * | 4/2013 | Hipple et al. | 381/104 |
| 8,965,774 B2 * | 2/2015 | Eppolito | 704/500 |
| 2004/0146170 A1 * | 7/2004 | Zint | 381/103 |
| 2005/0108357 A1 | 5/2005 | Sano | |
| 2008/0002844 A1 * | 1/2008 | Chin | 381/310 |
| 2009/0066639 A1 * | 3/2009 | Heitmann et al. | 345/156 |
| 2010/0211199 A1 * | 8/2010 | Naik et al. | 700/94 |
| 2010/0281367 A1 * | 11/2010 | Langmacher et al. | 715/716 |

(Continued)

OTHER PUBLICATIONS

Scott R. Garrigus, "Sound Forge® 8 Power! The Official Guide," 2005, Course Technology, pp. 1-48.*

(Continued)

*Primary Examiner* — Dino Kujundzic
(74) *Attorney, Agent, or Firm* — Kilpatrick Townsend & Stockton LLP (57) ABSTRACT

Systems and methods are disclosed to adjust the loudness or another audio attribute for one or more audio clips. Intra-track audio levels can automatically be equalized, for example, to achieve a homogeneous audio level for all clips within an audio track. Information about such audio adjustments may be identified and stored as information without destructively altering the underlying clip content. For example, keyframes may define changes to a fader that will be applied at different points along a track's timeline to achieve the audio adjustments when the track is played. An audio editing application can provide a feature for automatically determining appropriate keyframes, allow manual editing of keyframes, and use keyframes to display control curves that represent graphically the time-based adjustments made to track-specific faders, play test audio output, and output combined audio, among other things.

16 Claims, 5 Drawing Sheets

(56) References Cited

U.S. PATENT DOCUMENTS

2011/0175915 A1* 7/2011 Gehring .................. 715/716
2011/0258547 A1* 10/2011 Symons et al. ............... 715/723
2013/0061143 A1* 3/2013 Eppolito ................... 715/716

OTHER PUBLICATIONS

Scott R. Garrigus, "Sound Forge® 8 Power! The Official Guide," 2005, Course Technology, pp. 200-252 (renumbered as pp. 53-140).*

"Digital Audio and the Linux Operating System," Mike Raznick, NYU, Digital Audio Processing II, Final Research Paper, 22 pages.
"Augio Sound Studio 2.0, User's Guide," Augio Labs, 2002-2003, 26 pages.
"Waves, Plug-ins, Vocal Rider," http://www.waves.com/Content.aspx?id=9945 downloaded from the Internet on Mar. 3, 2010, 3 pages.
Search Report, Automatically Equalize Intra Track Level (Intra Track Level), IP.com, Inc., Nov. 12, 2009, 12 pages.
"PCM 8, 8-Channel PCM Digital Audio Workstation," Sadie Digital Precision, 2002, 2 pages.

* cited by examiner

SYSTEMS AND METHODS FOR ADJUSTING AUDIO ATTRIBUTES OF CLIP-BASED AUDIO CONTENT

FIELD

This disclosure relates generally to computer software that creates, edits, runs, provides, or otherwise uses audio clip-based electronic content.

BACKGROUND

Various types of electronic files are used to store audio content. As examples, the Waveform Audio file format (WAV) and the Audio Interchange file format (AIFF) and variants thereof are used to store audio data on computing devices. When such files are used on such a computing device, the audio stored in the files is played over a speaker which is typically part of or connected to the computing device. Various types of data files are also used to store electronic content that combines audio content with image and/or video content. When such content is played or otherwise used on a computing device, the audio and displayed content can be provided to a user, in some circumstances simultaneously, for example using a speaker and display monitor that are part of or connected to the computing device.

Whether combined with displayed content or not, audio content can be created, edited, and used by various software applications. For example, a digital audio workstation (DAW) is an electronic system designed to record, edit, and play back recorded sounds and other audio. As another example, Adobe® Premiere® Pro, is a timeline-based editing application that supports both video and audio editing. Adobe Premiere Pro allows a user to create and use one or more audio tracks in a single project that can ultimately be used to create a piece of electronic content combining those tracks. Each track can include one or more audio clips which are typically inserted by the user. Such a user can also adjust volume and other audio settings for each audio track.

Generally, various editing applications allow the creation and use of a sequence of audio tracks and/or clips. For example, in Adobe Premiere Pro, a sequence can be created, displayed, and edited in a timeline panel that shows when each of multiple tracks of a sequence are played with respect to the displayed timeline. Various problems and inefficiencies can occur in existing editing applications in circumstances where audio clips used in a project, sequence, or track do not have the same audio level. For example, in a project for a recording of an interview, the clip of the reporter's voice may be significantly louder than the clip of the interviewee's voice. While there are several methods used to facilitate creating an overall homogeneous loudness level, such methods are generally destructive (undoable but not reversible) because, once used, the underlying audio in the project is changed. Using non-destructive techniques on the other hand, for example, by manually inserting leveling devices such as compressors, requires significant user knowledge and interaction to correctly set parameters and use such features, and often result in unsatisfactory results.

SUMMARY

Systems and methods are disclosed to adjust the loudness or another audio attribute for one or more audio clips. Intra-track audio levels can automatically be equalized, for example, to achieve a homogeneous audio level for all clips within one or more audio tracks. Information about such audio adjustments may be identified and stored as information without destructively altering the underlying clip content. For example, keyframes may define changes to a final audio device such as a fader that will be applied at different points along a track's timeline to achieve the determined audio adjustments when the track is played. An audio editing application can provide a feature for automatically determining appropriate keyframes, allow manual editing of keyframes, use keyframes to display control curves that represent graphically the time-based adjustments made to track-specific faders, use keyframes to test audio output, and use keyframes to output continuous or otherwise combined audio, among other things.

One exemplary method comprises providing an audio editing application comprising a user interface displayed on a display device and usable to edit clip-based or file-based audio content. The method further involves receiving input to adjust an audio attribute of one or more clips. At least one of the clips is included in a track having an audio attribute controllable by a track-specific control. The method next involves, for one or more of the clips, determining a value representing the audio attribute of the clip, determining information for adjusting the audio attribute to a target value by adjusting the track-specific control for a track that includes the clip, and providing the information to play the clip as adjusted according to the information in the audio editing application without destructively modifying the underlying content.

Another exemplary method involves an audio editing application receiving input to adjust an audio attribute of one or more clips. At least one of the clips is included within a track having an audio attribute controllable by a track-specific control. The audio editing application includes an equalizing or other adjusting component that, in response to the input component receiving input to adjust the audio attribute of the clips, identifies a plurality of clips, determines values representing the audio attribute for each clip, determines keyframes for adjusting the audio attribute of the clips to a target value by adjusting the track-specific control for the track that includes the clip at specified times along a timeline, and provides the keyframes to play the clips as adjusted according to the keyframes in the audio editing application without destructively modifying clip content. The user interface may display a control curve that illustrates the audio attribute adjustments defined by the keyframes by displaying the level of the audio attribute at each point along the timeline.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

The methods and systems disclosed herein may be used in a variety of contexts and provide various advantages and features. To illustrate certain features and advantages the following discussion describes an embodiment involving automatically equalizing intra-track audio levels. However, it will be understood by those of skill in this art that the methods and techniques may be used in other circumstances and may be modified and adjusted as appropriate to address the particular requirements presented by those circumstances.

The term "clip" is used herein generally to refer to any piece of audio or representation of a piece of audio used in an audio editing application or environment. A clip can correspond to all or part of a file and, in an audio editing application or environment, can typically be embodied and/or displayed as a representation, such as waveform, displayed on a timeline. A clip can represent an underlying piece of media even if that content itself no longer exists.

The term "track" is used herein generally to refer to anything that includes one or more audio clips and for which audio setting can be adjusted. An audio track can include a single clip or multiple audio clips can be combined within a track. It should also be noted that a track may contain an audio clip that comprises the audio associated with a video clip.

The term "sequence" is used herein generally to refer to anything that specifies the use of one or multiple tracks and generally, but not always, specifies how such tracks are used with respect to a timeline in a project that can ultimately be used to create a piece of electronic content combining those tracks. Depending on the editing application or environment, such a project may include one or more sequences, tracks, and/or clips using various nesting and organizational associations. For example, a project may have multiple sequences, each sequence having multiple tracks, and each track having multiple clips.

One exemplary method provides an automated non-destructive way to equalize sound attributes such as loudness, RMS, or peak values for multiple audio clips associated with a timeline. For example, one exemplary method automatically equalizes intra-track audio levels to achieve a homogeneous audio level for all clips on a track. In contrast to destructively editing those clips individually as had been done previously, automatically equalizing multiple clips simultaneously and possibly at faster than real-time speeds can provide significant time savings and other benefits. The non-destructive approach also preserves the underlying clip content. Thus, if the clips are subsequently moved or changed, a user can determine to move the already computed keyframes associated with a clip or redo the equalizing process and again realize efficiencies while avoiding unnecessary loss of audio.

These illustrative examples are given to introduce the reader to the general subject matter discussed here and are not intended to limit the scope of the disclosed concepts. The following sections describe various additional embodiments and examples with reference to the drawings in which like numerals indicate like elements.

Illustrative Devices and Systems

Figure 1:
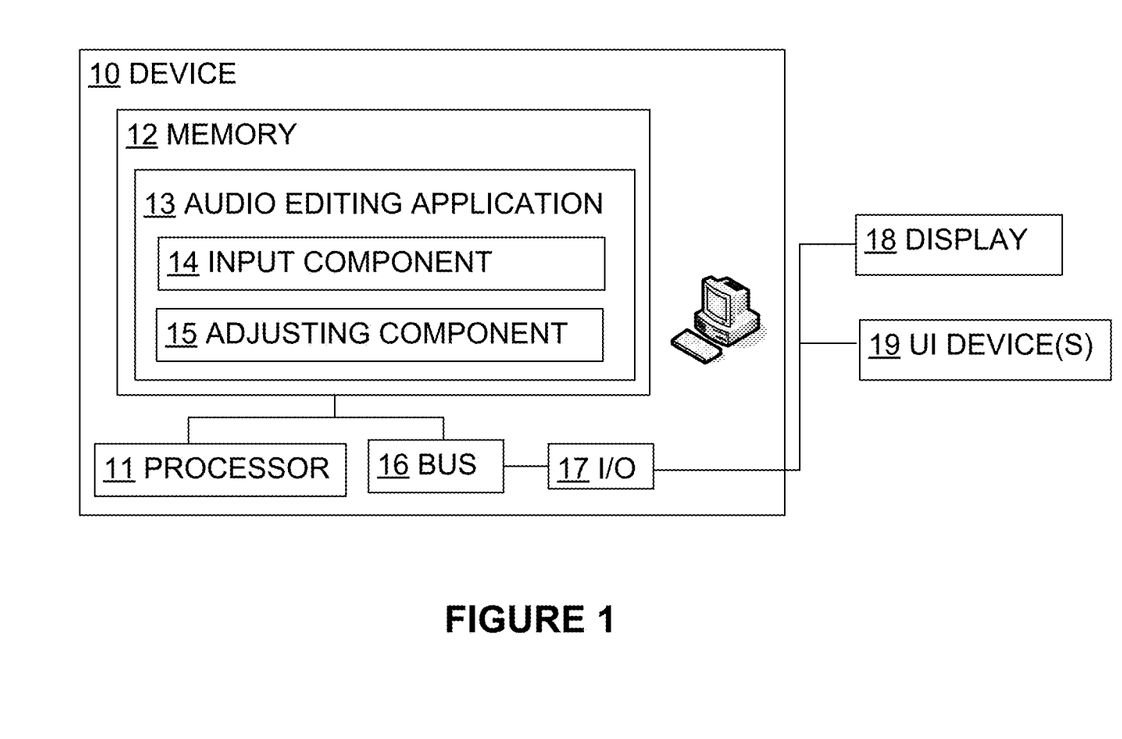
FIG. 1 is a block diagram depicting an exemplary computing device for use in certain embodiments.

Referring now to the drawings in which like numerals indicate like elements throughout the several Figures, FIG. 1 is a block diagram depicting an exemplary computing device for use in certain embodiments. An exemplary audio editing application 13 that executes on the exemplary device 10 is shown as a functional component. As is known to one of skill in the art, such applications may be resident in any suitable computer-readable medium and execute on any suitable processor. For example, as shown the network device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The device 10 may also comprise a number of external or internal devices such as a mouse, a CD-ROM, DVD, a keyboard, a display, audio speakers, or other input or output devices. For example, device 10 is shown with a display 18 and various user interface devices 19. A bus, such as bus 16, will typically be included in the device 10.

The audio editing application 13 is shown as including an input component 14 and an adjusting component 15 for purposes of illustrating certain features of certain exemplary embodiments disclosed herein. The input component 14 may receive user input, for example through User Interface (UI) devices 19, and can facilitate user interaction with a user interface of the audio editing application 13. In one exemplary embodiment, such an input component 14 receives one or more clips or other input to equalize or otherwise adjust with respect to an audio attribute, such as loudness. Such clips may, for example, be included within one or more tracks each allowing control of the audio attribute for the given track via a track-specific control. An adjusting component 15 may respond to such input in various ways to automatically equalize or otherwise adjust one or more the clips' audio attributes. In an exemplary embodiment, the adjusting component 15 is an equalizing component that, in response to the input component receiving input to adjust the audio attribute of the clips, identifies a plurality of clips, determines values representing the audio attribute for each clip, determines keyframes for adjusting the audio attribute of the clips to a target value by adjusting the track-specific control for the track that includes a clip at specified times along a timeline, and provides the keyframes to play the clips as adjusted according to the keyframes in the audio editing application without destructively modifying clip content. Other embodiments may, of course, utilize input components and adjusting components that function differently.

Exemplary Method of Adjusting an Audio Attribute in Multiple Clips

Figure 2:
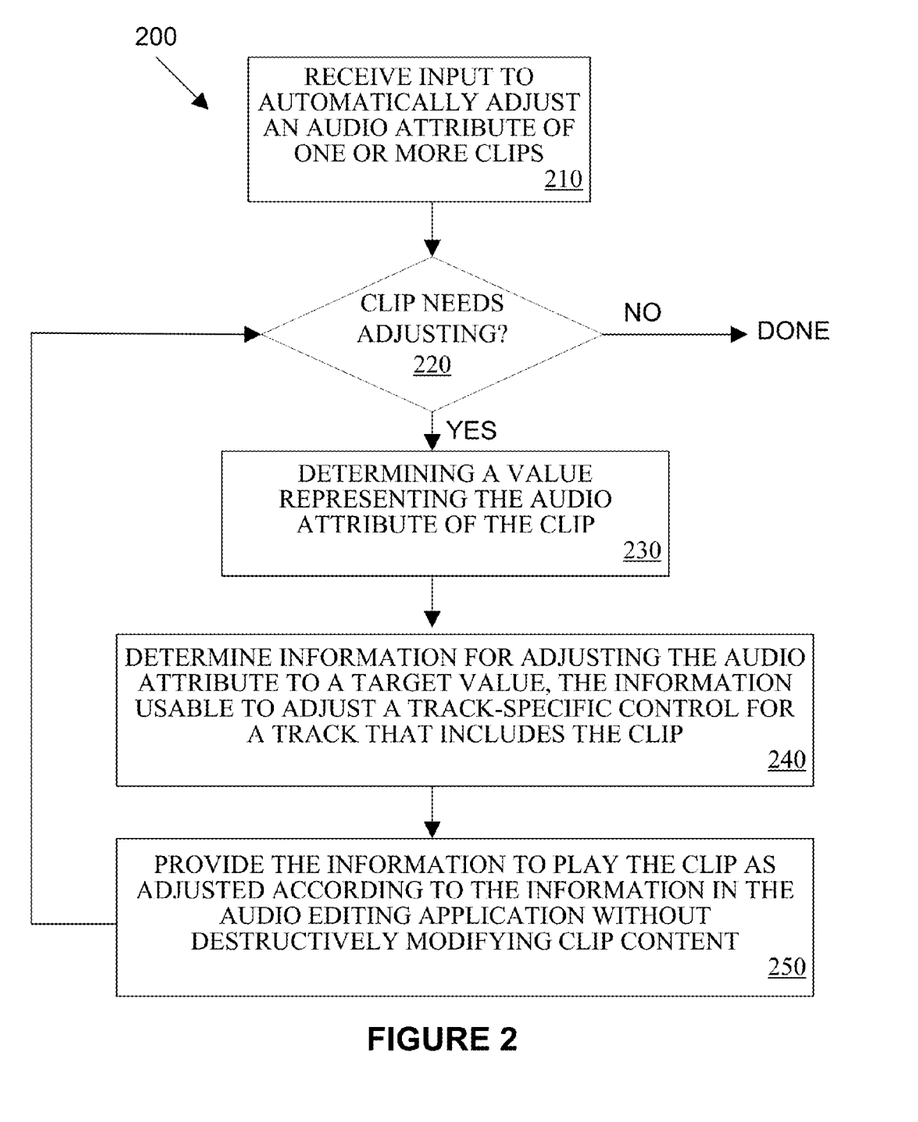
FIG. 2 is a flow chart illustrating an exemplary method that provides an automated way to adjust an audio attribute in multiple clips.

FIG. 2 is a flow chart illustrating an exemplary method 200 that provides an automated way to adjust an audio attribute in multiple clips. This exemplary method 200 involves receiving input to adjust an audio attribute of one or more clips, as shown in block 210. One or more of the clips may be associated with a track having an audio attribute controllable by a track-specific control. Accordingly, the audio attribute (e.g., loudness) of any clip contained in such a track can be controlled by controlling the track-specific control.

Clips can be identified in a variety of ways including as part of the input received to automatically adjust the audio attribute of the one or more clips shown in block 210. For example, a user may identify clips by selecting several clips individually, by selecting one or more tracks, by selecting one or more sequences, or by selecting an entire audio project within an audio editing application. The clips may be associated with the same or different timelines and may be associated with the same or different tracks.

The exemplary method 200 next involves analyzing the clips to determine a measure of the audio attribute for each clip. The method 200 determines whether a clip needs adjusting, as shown in block 220. If no clip needs adjusting, then the method is done. If a clip does need adjusting, the method proceeds to block 230 and determines a value representing the audio clip attribute of that clip. Such a value may provide an audio attribute measure that provides an estimate of the average loudness of the clip, for example. As a specific example, a clip's root mean square (RMS) level may be determined as the representative value to provide an estimate of how loud a clip is relative to other clips. In other embodiments, one or more other sound attributes or characteristics can be used as measures of average loudness or other sound quality of the clips.

The method 200 next involves determining information for adjusting the audio attribute to a target value, as shown in block 240. The information can be any type of information or component that is usable to adjust a track-specific control for a track containing the clip. In certain embodiments, adjustments are determined that can be applied to equalize the clips with respect to the audio attribute (e.g., loudness) so that all of the identified clips will, after application of the adjustments, exhibit the target value for the audio attribute. In certain embodiments, different clips of the one or more clips that are selected for automatic adjustment are adjusted using the same target value as means for equalizing the clips. In other embodiments, different clips of the one or more clips that are selected for automatic adjustment are adjusted using different target values to provide one or more other benefits, e.g., to make a reporter's voice louder than an interviewee's voice, etc.

A target value for one or more of the clips can be selected in a variety of ways. A user may select the target value, for example, by defining a reference clip so that all of the identified clips will, after application of the adjustments, have the same level as the reference clip. Alternatively, a user may expressly define one or more values, e.g., by providing value(s) for target RMS levels or other audio attributes. As yet another exemplary alternative, a target value may be determined automatically by averaging the clip attribute levels, e.g., using the average RMS level of all the RMS levels of the identified clips as the target value.

The method 200 next involves providing the information for adjusting the audio attribute to play the clip as adjusted according to the information without destructively modifying clip content, as shown in block 250. The method 200 then proceeds back to block 220 to determine whether any additional clips need to be adjusted.

Generally, certain embodiments identify information or mechanisms that specify audio attribute adjustments. Such information or mechanisms are usable to transform a clip without actually transforming the clip in an audio editing application. Instead, the information or mechanisms are available for use in playing the audio (e.g., for testing purposes) within the editing application. The information or mechanisms may be determined and applied so that multiple clips are homogenous with respect to the audio attribute. As a specific example, clips may be equalized so that they will have the same perceived loudness by adjusting one or more track-specific fader controls.

In one embodiment, an audio adjustment is a consistent change that can be applied for an entire clip. For example, the loudness of the clip may be adjusted higher or lower so that the average RMS of the clip is changed to match a target RMS level. For example, a fader for a track having the clip may be adjusted during play of the track to increase or decrease the perceived loudness of that clip. Thus, in editing applications in which each track is controlled by a track-specific fader, an algorithm can be applied that selects an appropriate fader level for the track based on the target audio attribute level of a clip within that track.

In other embodiments, audio attribute adjustments are changes to the audio attribute that occur at specified points along a timeline. Timeline-based audio attribute adjustments can be specified as keyframes along a track-specific or sequence-specific timeline. Such keyframes provide points along a timeline at which the audio attribute is adjusted. For example, if a given track comprises a first clip followed by a second clip where the second clip is significantly louder than the first clip, a keyframe may be created at the point along the timeline when the first clip stops and the second clip starts. This keyframe may indicate a change to a fader or other volume or audio control associated with the track. The change may adjust the fader to decrease the loudness of the track when that point along the timeline is reached so that the second clip's loudness is comparable to the loudness of the first clip. A keyframe may thus provide a control point along a timeline that causes adjustment to track volume level or other sound attribute. Such a keyframe can be stored as metadata about a track or otherwise stored and/or used in the audio editing application or elsewhere.

Keyframes can be determined to adjust audio attributes during the playing of a track to achieve various audio changes. For example, to increase a clip's RMS level to a higher value, one or more keyframes may be determined that increase the clip's loudness a predetermined amount throughout the length of the clip. Alternatively, to increase a clip's RMS level to a higher level, one or more keyframes may be determined that increase loudness during certain portions of the clip but not during other portions of the clip. Thus, even if a clip's audio attribute average level is to remain the same, keyframes may be used to increase and decrease that audio attribute level of the clip during different clip portions to further equalize loudness within the clip itself or to provide other adjustment as may be appropriate or desired by a user.

Accordingly, in certain embodiments, multiple keyframes are used to adjust an audio attribute in different amounts during the length of a clip. As an example, if a clip includes a speaker who gradually raises his speaking volume during the length of the clip, a series of keyframes can be created so that the loudness of the clip, after application of the keyframe changes to the audio attribute, is relatively consistent throughout the clip.

A series of keyframes used to control an audio attribute of a track and its included clips can be used to define a control curve that represents the level of the audio attribute at each point during the timeline for the track. Such a control curve can be automatically determined, displayed, and edited in an audio editing application and can provide a convenient way to visualize how an audio attribute changes during one or more clips of a track or sequence of tracks.

Figure 3A:
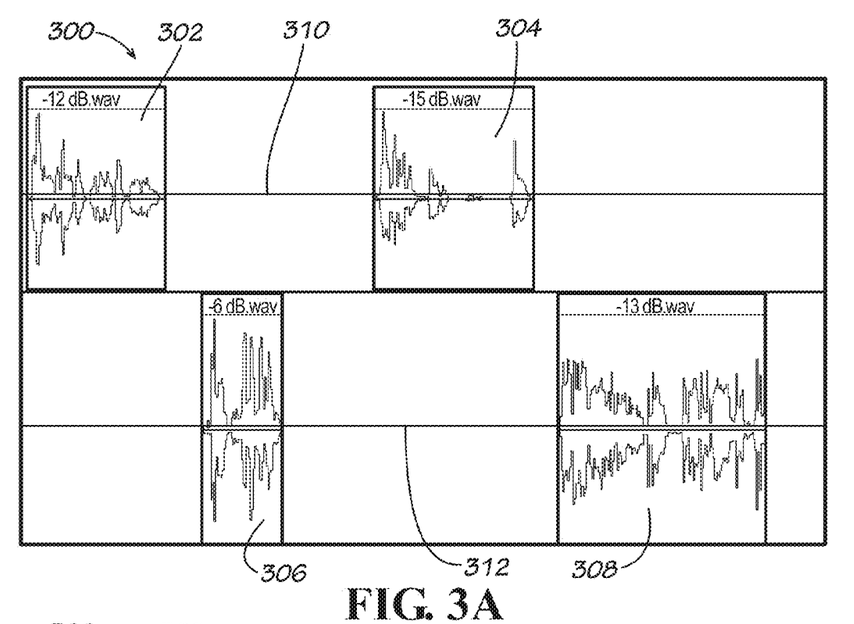
FIGS. 3A-C illustrate a user interface of an audio editing application.
Figure 3B:
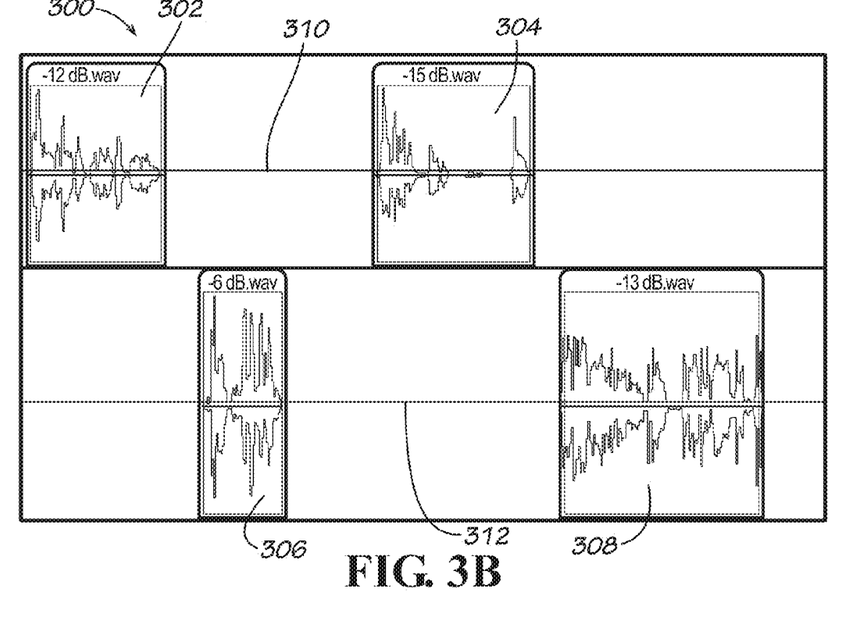
Figure 3C:
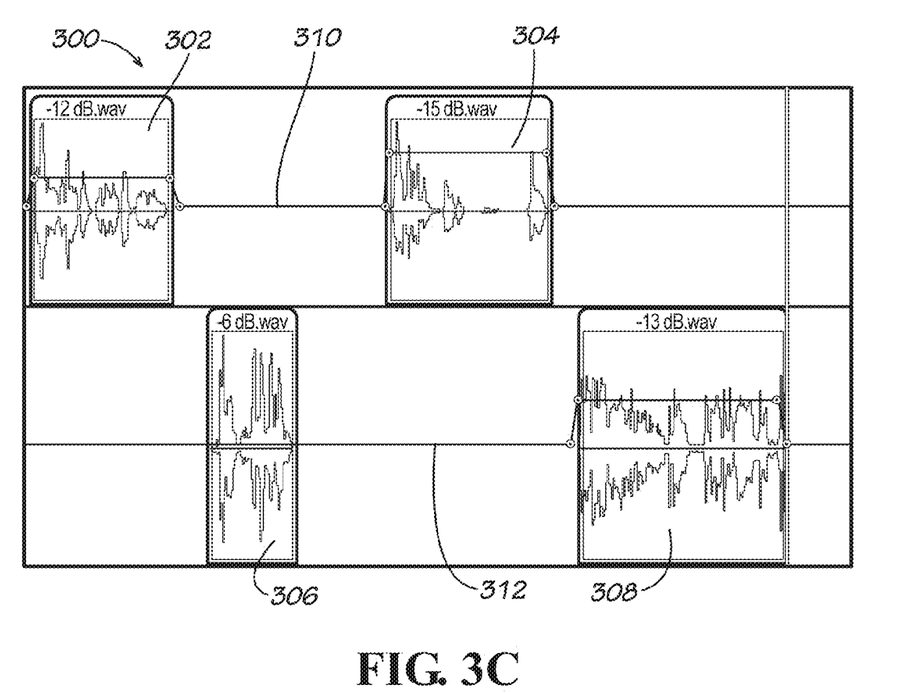

FIGS. 3A-C illustrate a user interface 300 of an audio editing application. FIG. 3A illustrates the user interface 300 as including several waveform clip representations 302, 304, 306, 308. Other aspects (not shown) of the user interface 300 may facilitate general audio editing functions as well as provide features specific to adjusting audio attributes (e.g., loudness) of one or more the of the represented clips. User interface 300 can facilitate an exemplary method of adjusting an audio attribute in multiple clips. Such an exemplary method may involve receiving input to adjust an audio attribute of one or more such clips.

FIG. 3B illustrates a selection of clips that will be adjusted with respect to an audio attribute. In this example, each of the clip waveform representations 302, 304, 306, 308 has been user selected. Such selections identify each of the associated clips which, in this example, are named −12 dB.wav, −15 dB.wav, −6 dB.wav, and −13 db.wav, respectively. A user may identify clips in other ways, for example, by selecting one or more tracks, by selecting one or more sequences, or by selecting an entire audio project within an audio editing application. In other embodiments, clips are identified automatically. For example, a user may select an adjustment feature which will be applied to all clips, all clips within a particular context, etc. In certain embodiments, the user interface of the audio editing application allows selection of clips that are associated with the same or different timelines and/or clips that are associated with the same or different tracks.

A matching method can be automatically or manually selected before or after selection of the clips that will be adjusted with respect to the audio attribute. For example, a user may select via a menu entry or context menu (not shown), that all currently selected clips will be matched to the loudest clip (e.g., to the clip named −6 dB.wav represented by clip waveform representation 306). An exemplary matching method can then be employed. In this example, the level of the loudest clip will remain unchanged. Appropriate adjustments, however, are computed for the level of the other selected clips, i.e., those represented by clip waveform representations 302, 304, 308. Such clips may be adjusted so that the average level of those clips matches the average level of the loudest clip, as an example. Such level matching or other audio attribute adjustment can be achieved in various ways. In this example, the level matching is achieved via track volume keyframe adjustments. Thus appropriate keyframe adjustments are determined for the clips represented by clip waveform representations 302, 304, 308.

FIG. 3C illustrates the user interface 300 displaying a control curve 310 that illustrates keyframe adjustments to the levels of the clips represented by clip waveform representations 302, 304 and, similarly, a control curve 312 that illustrates keyframe adjustments to the levels of the clips represented by clip waveform representations 306, 308. This provides visual feedback to a user and allows the user to visualize how the various clips will be adjusted. For example, the user can see that the level through the −6 dB.wav clip remains unchanged since the control curve 312 continues straight through the clip waveform representation 306, and also see that the level through the −13 dB.wav clip increases based on the control curve 312 having a higher position through the clip waveform representation 308. In some embodiments, a control curve represents keyframes and thus, changes that occur, within a clip, such that different portions of the clip have different audio attribute levels, according to those changes. In addition, in some embodiments, such a control curve may be provided in the context of a timeline that allows the user to visualize how the levels of various clips are adjusted with respect to one another over the course of such a timeline.

Note that while, in this example, clip waveform representations are separated onto two different control curves 310, 312, in other embodiments, all selected clips may be positioned with respect to a single control curve. In yet other embodiments, each clip may be positioned with respect to an individual control curve. A single control curve may be displayed in separate segments or portions. If multiple audio attributes are being adjusted, multiple control curves can be displayed with respect to the same clip(s) representations. More generally, a user interface may display clip waveform representations in any suitable way to achieve a variety of benefits.

Figure 4:
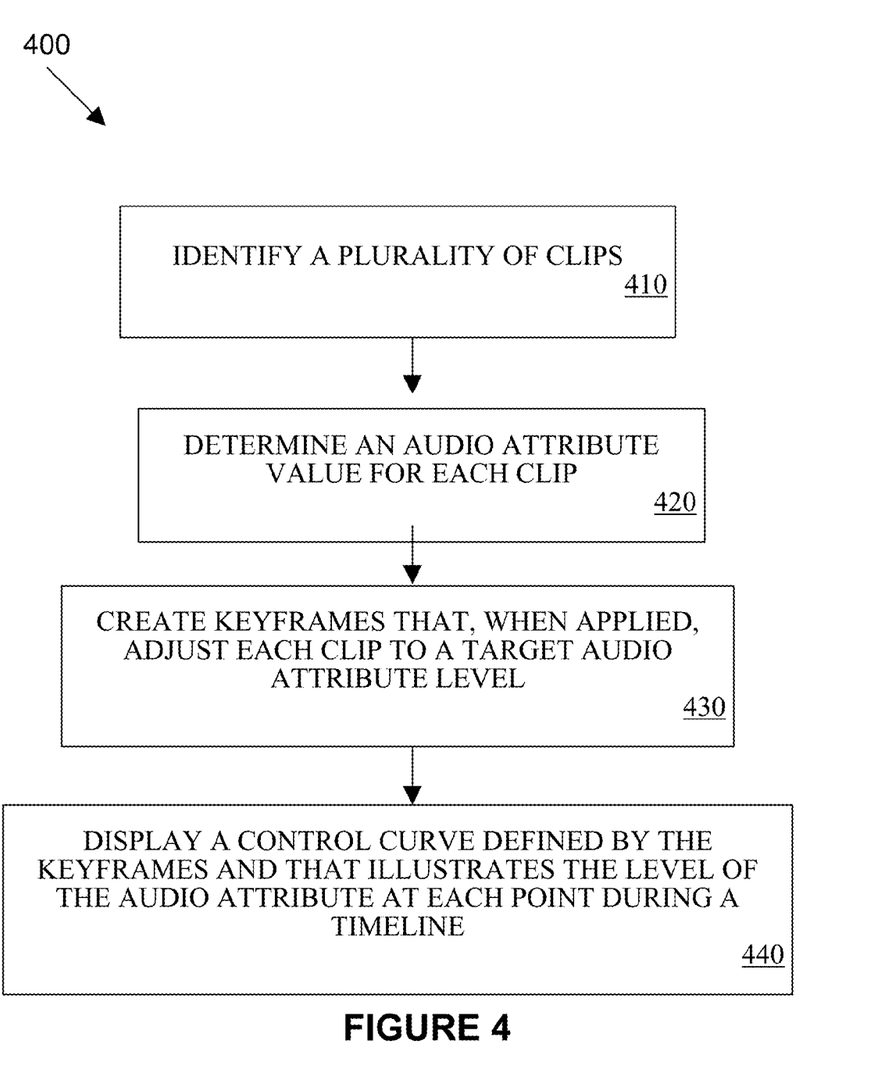
FIG. 4 is a flow chart illustrating an exemplary method of adjusting an audio attribute over different clips using multiple keyframes.

FIG. 4 is a flow chart illustrating an exemplary method of adjusting an audio attribute over different clips using multiple keyframes. This exemplary method 400 involves identifying a plurality of clips, as shown in block 410. The identified clips may comprise all clips that are within a selected track or selected sequence in an audio editing application.

After identifying the clips, the method 400 involves determining an audio attribute value for each clip, as shown in block 420. This may involve, as an example, determining an RMS level for each clip. Such values can be calculated by averaging values for different portions of a clip. For example, the size of such clip portions can be selected to be small enough so that the audio attribute (e.g., loudness) within a given portion is relatively consistent but not so small that spikes will be created. A portion duration of 5 to 100 milliseconds may be preferable, a portion duration of 25 to 75 milliseconds may be more preferable, and a portion duration of about 50 milliseconds may be most preferable for many types of audio content. However, other portion durations may be used as well. As a particular example, if a clip is 1000 milliseconds long then 20 portion values may be determined for this clip, where each portion is 50 milliseconds in duration. Averaging those values can provide the audio attribute value for the clip determined in block 420. The results of such determinations can be stored and used in a variety of ways.

The method 400 next involves creating keyframes that, when applied, adjust each of the clips to a target audio attribute level, as shown in block 430. A series of keyframes may be created to define a control curve. The method may further involve smoothing such a control curve, for example, by removing keyframes that only differ from adjacent keyframes by less than a certain value.

In certain embodiments, an audio editing application provides an editing feature that executes an algorithm to automatically equalize an audio attribute amongst two or more identified clips by creating keyframes and/or control curves. Certain embodiments further provide a user interface in such an audio editing application that allows a user to manually create, delete, or otherwise edit keyframes and/or control curves.

Generally, once identified, a keyframe or control curve may be used in various ways to facilitate the editing and creation of audio content. An audio editing application may allow a user to manually adjust a keyframe and then reapply the automated method to re-determine appropriate keyframes after making one or more changes. Clip content, for example, may be changed in a variety of ways. For example, an effect may be applied to a clip to change the underlying audio of the clip via destructive processing. As another example, the position and/or length of a clip may be changed. Such changes may alter the sound attributes of the clip and make re-equalization appropriate. The above method can be reapplied and new keyframe information determined for the various clips including the altered clips. Thus, re-applying the above method can automatically correct any sound discrepancies created by a user changing the sound attributes of a clip, making it easy for a user to ensure that audio content being developed is homogeneous with respect to the audio attribute.

The information or mechanisms can also be used when the editing application creates or outputs a continuous or otherwise combined output. Thus, an audio editing application can identify and store keyframe information as described above and use that information when the track is played within the editing application. In the audio editing application, the underlying content of the clips is preserved since simply defining the keyframes is not destructive. The track can be played in a way that accounts for the level adjustment according to the keyframe information so that the user can hear how the track will sound when it is later outputted, for example, as part of the continuous or combined file. However, the project and unaltered clips remain available within the audio editing application project for further edits and use.

In another embodiment, a user selects multiple clips and selects specific audio attribute levels for each of the clips and then applies an automatic function that creates keyframe and/or control curve information that will make the appropriate adjustments when applied. Thus, a user may specify that in an interview project with multiple clips, the clip associated with the reporter will be slightly louder than the clip associated with the interviewee by specifying specific audio attribute values for each clip or by specifying a relationship between the clips, e.g., specifying that clip 1 should be 1.2 times as loud as clip 2, etc.

In another embodiment, audio attribute adjustments are determined for clips and embodied in a dedicated component that is applied for each applicable track. Such a component could, for example, be a simple amplify effect component. Thus, in one example, a generated keyframe applies only to the dedicated amplify effect component, allowing the track volume control to run independently and according to otherwise-specified fades and other level changes. Another exemplary dedicated component could also cause both volume changes and compressor gain or loss.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
providing instructions stored on non-transitory computer readable medium that are interpreted by a processor to provide an audio editing application comprising a user interface displayed on a display device and usable to edit clip-based audio content;
receiving input to adjust an audio attribute of one or more clips of multiple clips, wherein the multiple clips are included in a track having an audio attribute controllable by a track-specific control; and in response to the input to adjust the audio attribute of the one or more clips, for at least one clip:
  determining a value representing the audio attribute of the clip by averaging values for different portions of the clip;
  determining information for automatically adjusting the audio attribute to a target value by adjusting the track-specific control for a track that includes the clip at specified points along a timeline, wherein the information comprises keyframes created along the timeline and each keyframe provides a point along the timeline at which the audio attribute is adjusted via the track-specific control for the track based on the value representing the audio attribute of the clip determined by averaging the values from the different portions of the clip, the information utilized for adjusting audio attributes of the multiple clips to the target value;
  determining, automatically, a control curve based on the information, the control curve illustrating keyframe adjustments that adjust the audio attribute within the multiple clips for the track along the timeline, wherein the control curve is displayed as defined by the keyframes; and
  providing the control curve to play the clip as adjusted according to the information for adjusting the audio attribute without destructively modifying clip content, wherein providing the control curve includes providing visual feedback showing how the clip will be adjusted according to the keyframe adjustments.

2. The method of claim 1 wherein the information can be used to adjust the audio attribute of the multiple clips so that all of the clips have a same perceived loudness.

3. The method of claim 1 wherein the information for adjusting the audio attribute to the target value specifies a consistent change to the track-specific control for the track that includes the clip.

4. The method of claim 1 wherein the value representing the audio attribute is a root mean square (RMS) level of the clip.

5. The method of claim 1 further comprising exporting output using the information for adjusting the audio attribute to the target value, wherein the output comprises the clips combined into a continuous audio file.

6. The method of claim 1 further comprising receiving a user edit to the information for adjusting the audio attribute to the target value.

7. The method of claim 1 wherein receiving input to adjust the audio attribute of the one or more clips comprises receiving one of:
  selections of several clips individually;
  a selection of a track that includes the clips;
  a selection of a sequence that includes the clips; or
  a selection of a project that includes the clips.

8. The method of claim 1 further comprising identifying the target value by receiving a selection of a reference clip, wherein, the value representing the audio attribute of the reference clip is identified as the target value.

9. The method of claim 1 wherein the track-specific control is a track-specific fader control.

10. The method of claim 1, wherein a position of the one or more clips within a track is changed.

11. The method of claim 1, wherein the control curve is a straight line when not part of the clip.

12. A system comprising:
  a computing device displaying a user interface of an audio editing application by interpreting instructions stored on non-transitory computer readable medium of the storage device, wherein the audio editing application is usable to edit clip-based audio content;
  an input component for receiving input to adjust an audio attribute of one or more clips of multiple clips, wherein the multiple clips are included within a track having an audio attribute controllable by a track-specific control; and
  an equalizing component that, in response to the input component receiving input to adjust the audio attribute of the one or more clips:
    identifies a plurality of clips;
    determines values representing the audio attribute for each clip by averaging values for different portions of each clip;
    determines keyframes for automatically adjusting the audio attribute of the one or more clips to a target value by adjusting the track-specific control for the track that includes each clip at specified times along a timeline based on the values representing the audio attribute for each clip determined by averaging the values for different portions of each clip, the keyframes created along the timeline;
    determines automatically a control curve based on the keyframes, the control curve illustrating keyframe adjustments that adjust the audio attribute within the multiple clips for the track along the timeline, wherein the control curve is displayed as defined by the keyframes; and
    provides the control curve to play the one or more clips as adjusted according to the control curve for adjusting the audio attribute without destructively modifying clip content, wherein providing the control curve includes providing visual feedback showing how the one or more clips will be adjusted according to the keyframe adjustments.

13. The system of claim 12 wherein size of the different portions is selected to be small enough so that the audio attribute within each of the different portions is relatively constant.

14. The system of claim 13 wherein the size of the different portions is between 25 and 75 milliseconds.

15. A non-transitory computer-readable medium on which is encoded program code, the program code comprising instructions for:
  providing instructions stored on non-transitory computer readable medium that are interpreted by a processor to provide an audio editing application comprising a user interface displayed on a display device and usable to edit clip-based audio content;
  receiving input to adjust an audio attribute of one or more clips of multiple clips, wherein the multiple clips are included within a track having an audio attribute controllable by a track-specific control; and
  in response to the input to adjust the audio attribute of the one or more clips for at least one clip:
    determining a value representing the audio attribute of the clip by averaging values for different portions of the clip;
    determining information for automatically adjusting the audio attribute to a target value by adjusting the track-specific control for a track that includes the clip at specified points along a timeline, wherein the information comprises keyframes created along the timeline and each keyframe provides a point along the timeline at which the audio attribute is adjusted via the track-specific control for the track based on the value representing the audio attribute of the clip determined by averaging the values from the different portions of the clip, the information utilized for adjusting audio attributes of the multiple clips to the target value;

determining, automatically, a control curve based on the information, the control curve illustrating keyframe adjustments that adjust the audio attribute within the multiple clips for the track along the timeline, wherein the control curve is displayed as defined by the keyframes; and providing the control curve to play the clip as adjusted according to the information for adjusting the audio attribute without destructively modifying clip content, wherein providing the control curve includes providing visual feedback showing how the clip will be adjusted according to the keyframe adjustments.

16. The non-transitory computer-readable medium of claim 15 wherein the information can be used to adjust the audio attribute of the multiple clips so that all of the clips have a same perceived loudness.

* * * * *